United States Patent [19]

Nagashima et al.

[11] 4,250,599
[45] Feb. 17, 1981

[54] CONNECTOR

[75] Inventors: Tsuneyasu Nagashima, Kamakurashi; Kazunori Machida, Yokohama, both of Japan

[73] Assignees: Kasai Kogyo Kabushiki Kaisha, Tokyo; Kato Hatsujo Kabushiki Kaisha, Yokohama, both of Japan

[21] Appl. No.: 129,634

[22] Filed: Mar. 12, 1980

[30] Foreign Application Priority Data

Apr. 11, 1979 [JP] Japan .......................... 54-48105[U]

[51] Int. Cl.³ .................. A44B 17/00; A44B 19/00; E05C 9/00
[52] U.S. Cl. ................................. 24/216; 24/211 L; 292/17; 403/408; 411/54
[58] Field of Search ............... 24/216, 211 L, 241 S; 292/17, 18, DIG. 38; 85/80, 81; 52/511; 403/405, 406, 407, 408, DIG. 10

[56] References Cited

U.S. PATENT DOCUMENTS

| | | | |
|---|---|---|---|
| 2,342,832 | 2/1944 | Borchers | 292/17 |
| 2,616,142 | 11/1952 | Tinnerman | 52/511 |
| 2,946,612 | 7/1960 | Ahlgren | 292/17 |
| 3,038,747 | 6/1962 | Rapata | 292/17 |
| 3,094,757 | 6/1963 | Blake | 24/216 |
| 3,103,378 | 9/1963 | Ahlgren | 292/17 |
| 3,375,749 | 4/1968 | Coldren et al. | 85/80 |
| 3,678,798 | 7/1972 | Van Niel | 85/81 |
| 3,863,421 | 2/1975 | Busch et al. | 403/408 |

Primary Examiner—Victor N. Sakran
Attorney, Agent, or Firm—Koda and Androlia

[57] ABSTRACT

A coupling device for coupling together a plurality of plates which includes a push pin which clasps one of the plates and which has a leg formed on its undersurface, a carrier box which is inserted and anchored in a slot formed in another of the plates and which has a slide slot formed in its undersurface and an engaging base which is loosely inserted into the slide slot of the carrier box so that it is free to move in a horizontal plane and which has arms formed on its upper surface that resiliently clasp the leg of the push pin.

4 Claims, 6 Drawing Figures

CONNECTOR

BACKGROUND OF THE INVENTION

1. Field of the Invention

This invention relates to coupling devices for use in the assembly and disassembly of a multiple number of plates.

2. Prior Art

A conventional coupling device which relates to the present invention is described in the U.S. Pat. No. 3,038,747. In this conventional design, an anchor part which is anchored in one plate is equipped with a bifurcated resilient part which resiliently clasps a push pin that is pushed in through an opening formed in the central portion of the anchor part. The push pin is free to slide in a direction perpendicular to the direction of the resilient force of the resilient part. However, since the push pin is clasped by the resilient part, it cannot move in the direction of the resilient force of the resilient part. When two plates are coupled by means of the above-described anchor part and push pin, one plate is engaged with the anchor part and the other plate is engaged with the push pin. However, since the push pin can only slide in one direction relative to the anchor part, this design suffers from the drawback in that it is difficult to absorb any positional misalignment of the slots in the plates or any discrepancy in the spacing of the slots, etc.

SUMMARY OF THE INVENTION

Accordingly, it is a general object of the present invention to provide a coupling device which can absorb any dimentional errors or discrepancies in the spacing of the slots in plates to be coupled together.

In keeping with the principles of the present invention, the objects are accomplished by a unique connector for coupling together a multiple number of plates. The connector consists of a push pin which clasps one plate and which has a leg formed on its undersurface, a carrier box which is inserted and anchored in a slot formed in another plate and which has a slide slot formed in its undersurface and an engaging base which is loosely inserted into the slide slot of the carrier box so that it is free to move in a horizontal plane and which has arms formed on its upper surface that resiliently clasp the leg of the push pin.

BRIEF DESCRIPTION OF THE DRAWINGS

The above-mentioned features and objects of the present invention will become more apparent with reference to the following description taken in conjunction with the accompanying drawings, wherein like reference numerals denote like elements and in which.

DETAILED DESCRIPTION OF THE INVENTION

Figure 1:
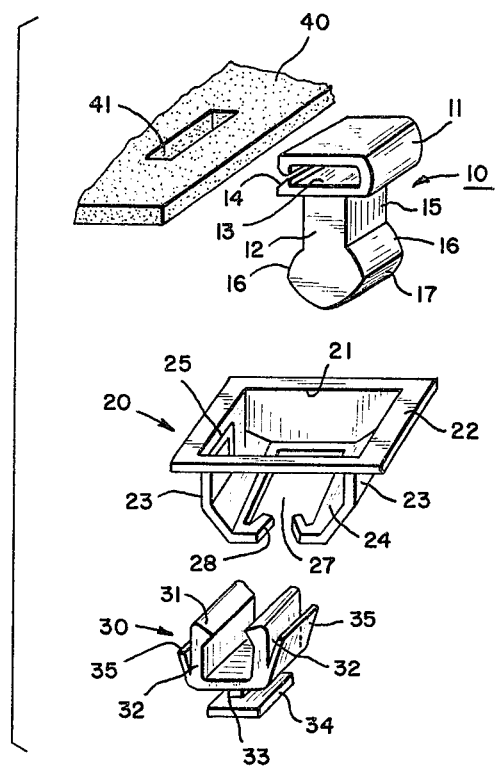
FIG. 1 is an exploded oblique view illustrating one embodiment of a connector in accordance with the teachings of the present invention.

Referring more particularly to Figures, shown in FIG. 1 is a coupling device in accordance with the teachings of the present invention. The coupling device or connector includes a push pin 10, a carrier box 20 and an engaging base 30. All these parts can be made of plastic. The push pin 10 consists of a clasping part 11 which clasps an ornamental plate 40 and a leg 12 which is an integral continuation of the clasping part 11. The clasping part 11 is generally U-shaped. Engaging claws 14 which engage from above and below with a slot 41 formed in the ornamental plate 40 are formed facing each other on the upper and lower interior surfaces at the open end of the space 13 of the clasping part 11. The leg 12 consists of a vertical leg portion 15 which is an integral continuation of the clasping part 11, a shoulder portion 16 which slopes outward from the vertical leg portion 15 and a guide portion 17 which slopes from the shoulder portion 16 to form a tip.

Figure 2A:
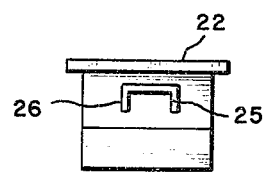
FIG. 2(a) and FIG. 2(b) show respectively front and side views of a carrier box in accordance with the teachings of the present invention.
Figure 2B:
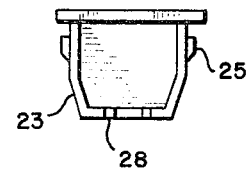

As is shown in FIGS. 1 and 2, the carrier box 20 includes a flange 22 which has an opening 21 formed in its upper surface, walls 23 which extend downwardly from the flange 22 along parallel planes which face each other across the opening 21 and bottom parts 24 which extend inwardly from the bottom edges of the walls 23 and which are connected with each other at one end of the carrier box 20. Engaging parts 25 which engage with a slot 51 formed in a panel 50 (see FIG. 4) are formed in the walls 23. The upper edges of these engaging parts 25 project from the exterior surfaces of the walls 23. Cutout slots 26 are formed in the walls 23 so that the upper edges and side surfaces of the engaging parts 25 are separated from the surfaces of the walls 23. A slide slot 27 which is open at one end is formed between the bottom parts 24. Retaining arms 28 are formed facing each other on both sides of the opening of the slide slot 27.

Figure 3:
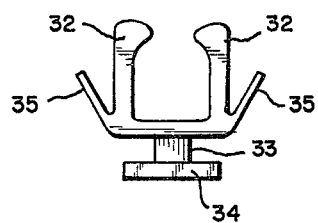
FIG. 3 is a front view of an engaging base in accordance with the teachings of the present invention.

As is shown in FIGS. 1 and 3, engaging base 30 includes arms 32 which are formed parallel to each other on the upper surface of the engaging base 30 and which have projecting claws 31 that resiliently clasp the shoulder portion 16 of the push pin 10, a vertical leg 33 which is formed on the bottom surface of the connected arms 32 which is smaller in width than the slide slot 27 of the carrier box 20 and which is formed so that it can engage with the retaining arms 28 and a bottom plate 34 which is formed on the bottom end of the vertical leg 33 and which is wider than the slide slot 27 of the carrier box 20 and which is formed so that it can engage with the retaining arms 28. The engaging base 30 also includes a bottom plate 34 which is formed at the bottom end of the vertical leg 33 and is wider than the slot 27 of the carrier box 20. Furthermore, tongue parts 35 which extend upwardly and engage with the interior surfaces of the walls 23 of the carrier box 20 are formed at the lower ends of the arms 32.

Figure 4:
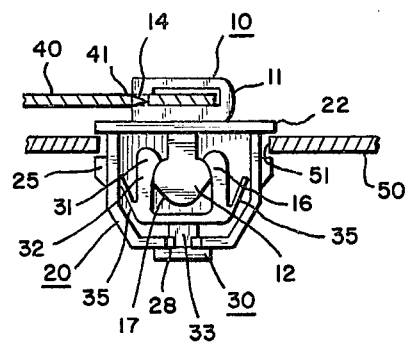
FIG. 4 is a front view illustrating the assembly of a connector in accordance with the teachings of the present invention.

In operation, the connector is assembled as is shown in FIG. 4. In particular, the push pin 10 is pushed onto the ornamental plate 40. When the push pin 10 is pushed onto the ornamental plate 40 with the engaging claws 14 of the push pin 10 aligned with the edges of the ornamental plate, the engaging claws 14 engage from above and below with the slot 41 formed in the ornamental plate 40 so that the push pin 10 is firmly anchored to the ornamental plate 40. Meanwhile, when the vertical leg 33 of the engaging base 30 is pushed into the carrier box 20 between the retaining arms 28, the vertical leg 33 spreads the retaining arms 28 apart. Apart the vertical leg 33 has entered the slide slot 27, the resilient force of the retaining arms 28 causes the retaining arms 28 to return to their original position. Accordingly, the retaining arms 28 prevent the engaging base 30 from slipping out. Thus, the engaging base 30 is loosely anchored to the carrier box 20. The dimentional difference between the slide slot 27 and the vertical leg 33 allows the engaging base 30 to move freely along the X and Y axes of a horizontal plane with respect to the carrier box 20. When the bottom parts 24 of the carrier box 20 are pushed into the slot 51 in the panel 50 with the engaging base 30 inserted in the carrier box 20, the carrier box 20 is secured to the panel 50 by the flange 22 and the engaging parts 25. Next, when the guide portion 17 of the push pin 10 attached to the ornamental plate 40 is pushed into the engaging base 30 between the projecting claws 31 of the engaging base 30, the resilient force of the arms 32 causes the projecting claws 31 to clasp the shoulder portion 16 of the push pin 10 so that the push pin 10 is secured to the engaging base 30.

As a result, the ornamental plate 40 is fastened to the panel 50 via the connector. As is described above, space between the vertical leg 33 and the slide slot 27 allows the engaging base 30 to move freely in a horizontal plane. Accordingly, even if the slot 41 in the ornamental plate 40 is not properly aligned with the slot 41 in the ornamental plate 40 is not properly aligned with the slot 51 in the panel 50, the misalignment of the slots 41 and 51 is absorbed and the plate 40 and panel 50 can be coupled together without hindrance. Furthermore, the tongue parts 35 are not absolutely necessary; however, since the tongue part 35 serve to absorb any rattle between the carrier box 20 and the engaging base 30 by resiliently engaging with the interior surfaces of the carrier box 20, the installation of the tongue parts 35 makes it possible to obtain a superior connector.

Figure 5:
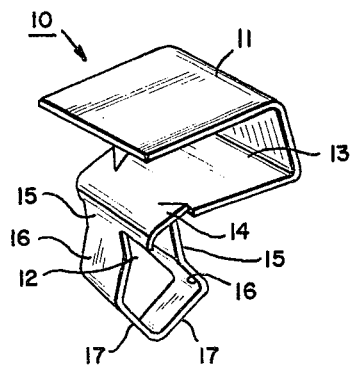
FIG. 5 is an oblique view illustrating another embodiment of a push pin in accordance with the teachings of the present invention.

Furthermore, in the embodiment described above, the push pin 10 was molded from plastic. However, it would also be possible to form the push pin 10 by bending a metal plate as shown in FIG. 5. In FIG. 5, those parts which are the same or correspond to parts in FIG. 1 are given like numerals and its description of their interconnection in operation will be omitted.

As is clear from the above description, the coupling device provided by the present invention is able to absorb any error in the relative positions of the slots in the coupled plates. Accordingly, this invention possesses a special feature in that a high degree of precision in slot positioning is not required.

It should be apparent to those skilled in the art that the above-described embodiments are merely illustrative of but a few of many possible specific embodiments which represent the application of the principles of the present invention. Numerous and varied other arrangements can be readily devised by those skilled in the art without departing from the spirit and scope of the invention.

We claim:
1. A coupling device for coupling together a plurality of plates, said coupling device comprising:
   a push pin which clasps one of said plates and which has a leg formed on its undersurface;
   a carrier box to be inserted into and anchored to a slot formed in another of said plates having a slide slot formed in an undersurface thereof; and
   an engaging base to be loosely inserted into said slide slot of said carrier box so that said engaging base is free to move in a horizontal plane, said engaging base comprising arms formed on its upper surface which resiliently clasp said leg of said push pin.

2. A coupling device according to claim 1, wherein clasping parts are formed on said push pin and said clasping parts include engaging claws which engage with a slot in said plate.

3. A coupling device according to claim 1, wherein one end of said slide slot in said carrier box is open, retaining arms which prevent the engaging base from slipping out of the slide slot are formed in said open end of said slide slot and said engaging base has a vertical leg formed on its undersurface which is loosely inserted into said slide slot through said gap between said retaining arms.

4. A coupling device according to claim 1, wherein tongue parts which extend upwardly and engage with the interior surface of the walls of said carrier box are formed on said engaging base.

* * * * *